United States Patent
Foti et al.

[15] 3,682,203
[45] Aug. 8, 1972

[54] FLEXIBLE METAL HOSE

[72] Inventors: Sam J. Foti, Lyndhurst, Ohio 44124; Charles Y. Neff, Beachwood, Ohio 44122

[73] Assignee: The Federal Metal Hose Corp., Parnesville, Ohio

[22] Filed: Jan. 23, 1970

[21] Appl. No.: 5,246

[52] U.S. Cl. ................................................138/135
[51] Int. Cl. ..............................................F16s 11/16
[58] Field of Search ....72/49, 50; 138/129, 134, 135, 138/136, 154, 127, 131, 133; 174/108, 109

[56] References Cited

UNITED STATES PATENTS

| | | | |
|---|---|---|---|
| 630,636 | 8/1899 | Sundh | 138/134 X |
| 1,598,872 | 9/1926 | Palmer | 138/135 |
| 1,913,390 | 6/1933 | Hungerford | 138/135 |
| 3,455,584 | 7/1969 | Henrickson | 138/154 X |

FOREIGN PATENTS OR APPLICATIONS

| | | | |
|---|---|---|---|
| 628,765 | 9/1949 | Great Britain | 138/134 |
| 419,726 | 4/1947 | Italy | 138/135 |

Primary Examiner—Edward J. Earls
Attorney—McCoy, Greene and Howell

[57] ABSTRACT

Flexible metal hose of the type formed from a helically wound metal strip with the edges of adjacent helical turns or convolution deformed to interfold slidably so that adjacent helical turns slide axially against one another to permit the hose to be flexed along its axis, wherein certain surfaces of the hose are provided with a plurality of small projections which slidably locate in a plurality of small recessions formed in certain other surfaces of the hose, the recessions being formed to impede the projections from sliding therein in directions not generally parallel to the hose axis but not to impede such sliding in the axial direction; either or both of said projections and recessions being elongated to reinforce the surfaces on which they are located against bending; and a method of forming such hose.

39 Claims, 10 Drawing Figures

Patented Aug. 8, 1972

INVENTORS
SAM J. FOTI
CHARLES Y. NEFF
BY
*McCoy, Greene & Howell*
ATTORNEYS

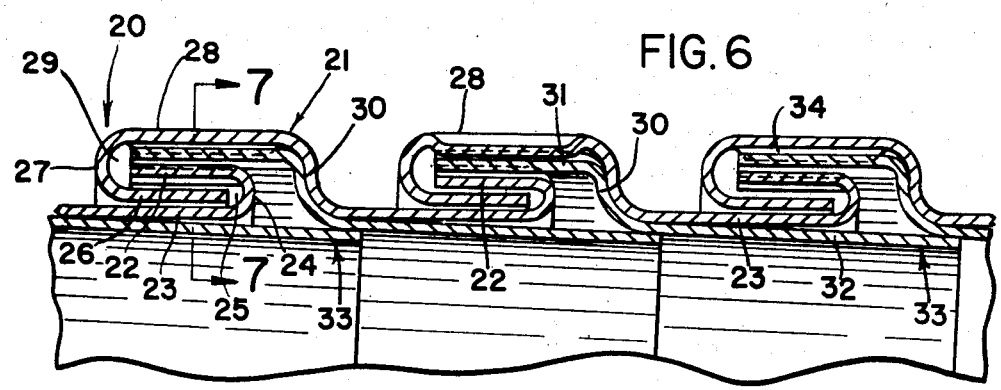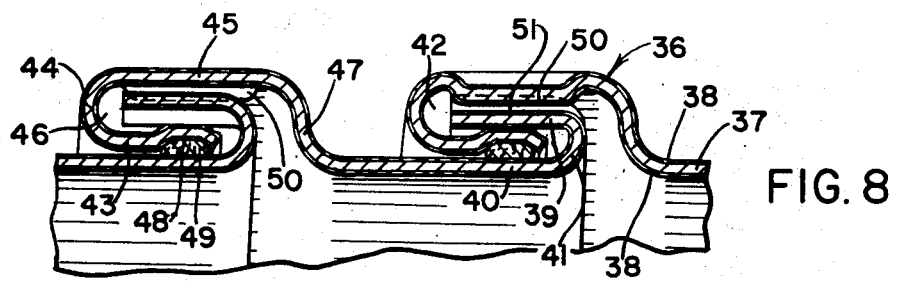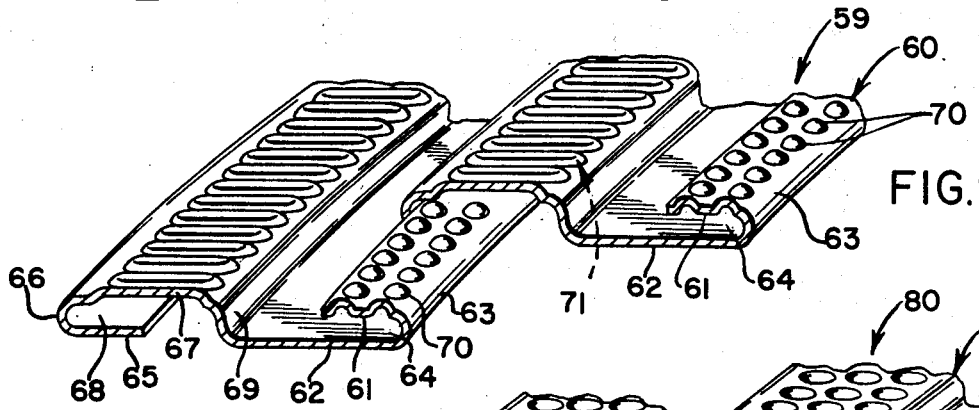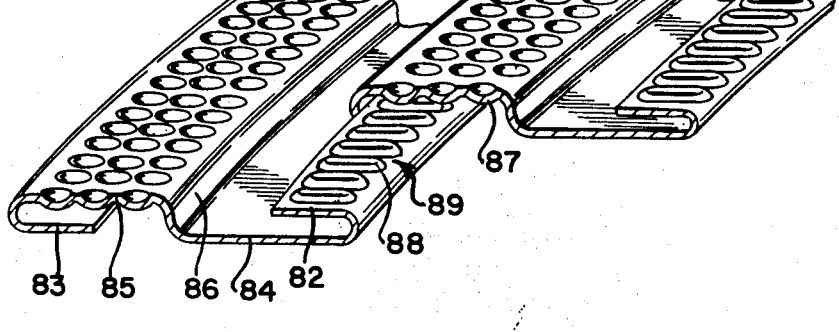

FLEXIBLE METAL HOSE

BACKGROUND AND SUMMARY OF INVENTION

The present invention relates to strip-wound flexible metal hose or tubing formed from a metal strip shaped and helically wound with clearances permitting sliding movement of adjacent turns of the strip in relation to each other enabling the hose to bend or flex and to a method for forming such hose. More particularly, the present invention relates to hose as described above wherein at least some of the axial surfaces of adjacent turns are provided with special surface configurations, such as mating projections and recessions, which permit the surfaces to move relative to one another only in the direction required for flexing and hinder them from moving angularly in other directions and to a method for forming such hose.

Strip-wound flexible metal hose has long been employed in materials handling installations where abrasive or corrosive substances must be transported, and also in the handling of food stuffs and plastics where high purity must be maintained.

Strip-wound metal hose has been constructed from a metal strip helically wound with the adjacent edges interconnecting in a manner which permits adjacent turns to slide against one another when the hose is flexed. Conventional strip-wound flexible metal hose is produced in a variety of constructions including rough bore, plastic coated and smooth bore (as shown in U.S. Pat. No. 1,598,872).

A great disadvantage of strip-wound flexible metal hose has been, however, the tendency for the interconnecting edges of the hose to part or unwrap when subjected to angular twisting forces or when the hose is cut to length for installation. When the hose wall parts, it is usually impossible to repair. Accordingly, it has been common practice to take precautions against this occurrence. For example, one technique that has been employed for a great many years to prevent strip-wound flexible metal hose from unwinding when cut has been to first wrap the hose with tape at the site of the intended cut and then, after the hose has been cut, to crimp the hose at its edge.

We have found that we can substantially reduce the tendency of the interconnecting edges of the hose to part by constructing the hose in a manner to eliminate any substantial angular sliding between the adjacent turns and we can do this without impairing the ability of the hose to flex. We have accomplished this by providing at least some of the axial sliding surfaces of adjacent turns with special surface configurations, such as a plurality of mating projections and recessions, which permit the surfaces to slide in the direction generally parallel to the hose axis, but which prevent the surfaces from sliding in other directions and especially in the angular direction. Hose formed according to the present invention does not normally need to be wrapped and crimped when cut, and can withstand relatively great angular twisting forces.

An object of the present invention is to provide a strip-wound flexible metal hose which has improved resistance to parting or unwinding when subjected to angular twisting forces.

Another object of the present invention is to provide a strip-wound flexible metal hose which has improved resistance to parting or unwinding when cut to length.

A further object of the present invention is to provide a strip-wound flexible metal hose which has improved resistance to parting or unwinding, but which has a substantially circular continuously curved cross-section and is thereby suitable for general purpose installations with standard fittings and the like.

Still another object of the present invention is to provide a parting-resistance strip-wound flexible hose having improved and reinforced walls.

A still further object of the present invention is to provide a strip-wound flexible metal hose which fulfills one or more of the foregoing objects without any appreciable loss of flexibility and/or without requiring special or extra-heavy gage metal strip.

A still further object of the present invention is to provide a method of forming parting-resistant strip-wound flexible metal hose which employs standard strip-wound flexible metal hose forming machinery with slight modifications.

BRIEF DESCRIPTION OF DRAWINGS

FIG. 6 is an enlarged side elevational view, with portions broken away and shown in section of an unflexed length of smooth bore (lined) flexible metal hose constructed in accordance with the present invention.

FIG. 8 is an enlarged sectional view of a portion of an unflexed length of unlined plastic coated flexible metal hose constructed in accordance with the present invention.

FIG. 9 is an enlarged perspective section view of portions of two adjacent helical turns of an unlined flexible metal hose provided with a further type of surface configuration within the scope of the present invention.

FIG. 10 is an enlarged perspective sectional view of portions of two adjacent helical turns of an unlined flexible metal hose provided with a further type of surface configuration within the scope of the present invention.

DESCRIPTION OF PREFERRED EMBODIMENTS

Figure 1:
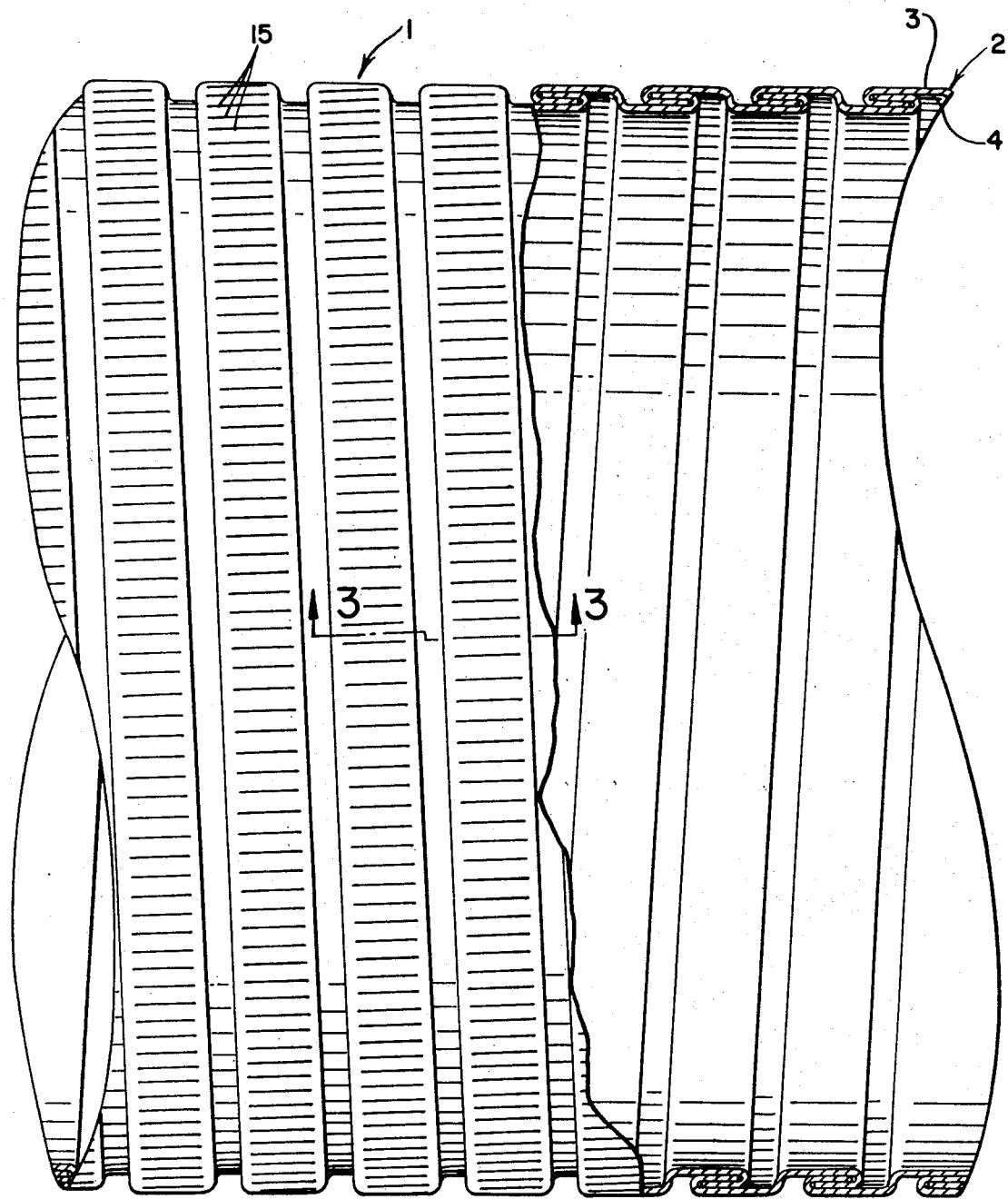
FIG. 1 is an enlarged side elevational view, with portions broken away and shown in section, of an unflexed length of rough bore (unlined) flexible metal hose constructed in accordance with the present invention.
Figure 3:
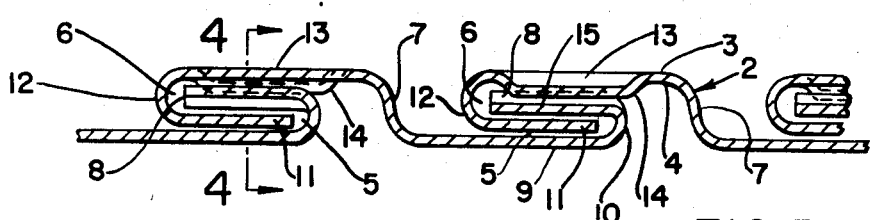
FIG. 3 is an enlarged section of the hose shown in FIG. 1 taken along the lines 3—3 of FIG. 1.
Figure 4:
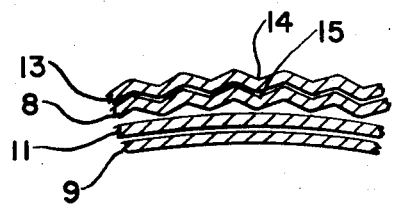
FIG. 4 is a transverse section of the hose shown in FIG. 1, taken along the lines 4—4 of FIG. 3.

FIGS. 1–5 show a section of flexible unlined ("rough bore") stainless steel metal hose 1 constructed in accordance with the principles of the present invention comprising a metal strip 2 having opposed major surfaces arbitrarily designated the "top surface" 3 and the "bottom surface" 4 for reference purposes herein. One lateral edge of the metal strip 2 is bent reversely over its entire length to lie generally parallel to, adjacent to, and spaced from the top surface 3 of the metal strip 2 forming an outwardly opening channel 5 therewith (hereafter the "first channel 5"). The opposed lateral edge of the metal strip 2 is bent reversely over its entire length to lie generally parallel to, adjacent to, and spaced from the bottom surface 4 forming an inwardly opening channel 6 therewith (hereafter the "second channel 6"). The strip 2 is also deformed to provide a narrow wall 7 between the aforesaid first and second channels 5 and 6 so that those channels are offset from one another, the narrow wall being generally perpendicular to the top and bottom surfaces 3 and 4 and extending radially in the assembled hose. Bent as described, the metal strip 2 has a generally S-shaped cross-sectional configuration.

Thus, the metal strip 2 is comprised, in cross section, of a first axially extending free edge portion 8 and a first axially extending medial portion 9 joined by a first narrow radial base portion 10 to form the aforesaid first channel 5; and a second axially extending free edge portion 11 joined by a second narrow radial 12 base portion to a second axially extending medial portion 13 forming the aforesaid second channel 6. The first and second free edge portions 8 and 11 lie generally parallel to both the hose axis and the first and second medial portions 9 and 13, respectively. The first and second medial portions 9 and 13 are offset from one another and are joined by the narrow generally radial connecting portion 7.

The metal strip 2 is wound helically with adjacent turns interlocking. The first free edge portion 8 locates in the second channel 6 and the second free edge portion 11 locates in the first channel 5 so that the first and second channels 5 and 6 are interfitted.

Figure 2:
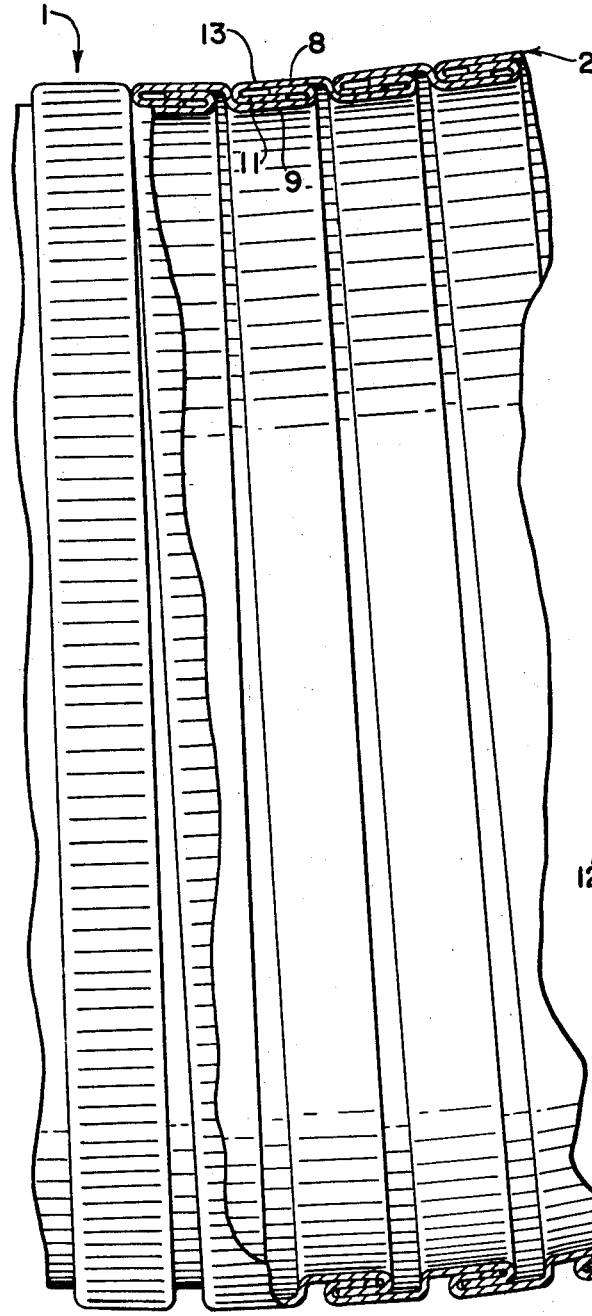
FIG. 2 is an enlarged side elevational view of a flexed length of the hose shown in FIG. 1, with parts broken away and shown in section.
Figure 5:
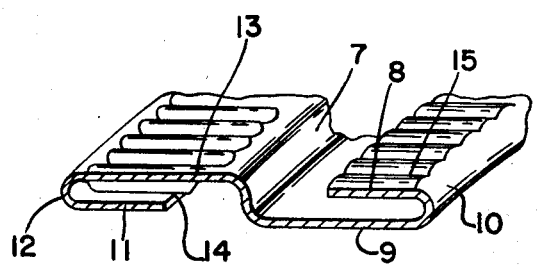
FIG. 5 is an enlarged perspective sectional view of a portion of a single helical turn of the hose shown in FIG. 1.

The interlocking turns of the strip 2 slide relative to one another in a direction generally parallel to the axis of the hose, as shown in FIG. 2. It is primarily this axial sliding action which accounts for the high degree of flexibility achieved by hose of this design.

As previously noted, the desired generally axial sliding action has, in the past, been accompanied by a degree of sliding in other directions. We have found that we can greatly reduce the tendency of the hose to part by substantially eliminating movement in the non-axial directions. This has proven to be of great benefit inasmuch as hose of this type is expensive to replace and can seldom be repaired once it has sprung apart.

In the preferred form of our invention shown in FIGS. 1 to 5, we have accomplished the desired result by providing the radially inner surface of the second medial portion 13 of the deformed metal strip 2 with a plurality of minute, angularly spaced elongated projections 14 and by providing the radially outer surface of the first free edge portion 8 with a plurality of spaced elongated indentations or recessions 15. The projections 14 and recessions 15 are each aligned in a single row and are elongated in a direction generally parallel to the hose axis.

While the hose of our invention may be manufactured in various sizes, the actual size of the particular hose shown in FIGS. 1-5 is about 4¼ inches in diameter. The projections are approximately one-fourth inch wide and one fifty-sixth inch high and spaced about one-fourteenth inch center to center. The indentations 15 similarly have a width of about one-fourteenth inch, a depth of about one fifty-sixth inch and are spaced about one-fourteenth inch center to center. In standard size hose constructions for example, as shown in FIGS. 1-5, the projections will normally be less than about one twenty-eighth inch high and the recessions will normally be less than about one twenty-eighth inch deep. The height and depth of the projections and recessions only need be great enough to create interference between the strip surfaces. As a general rule, the size of projections and recessions that are required will vary in direct relation to the thickness of the strip.

When the surfaces bearing the aforesaid projections 14 and indentations 15 are in contact in the assembled hose 1 the projections 14 mate with the indentations 15, which tends to prevent those surfaces from sliding across one another in any direction except in a direction generally parallel to the longitudinal hose axis.

It is preferred that the hose have a large number of projections and recessions per helical turn to assure that the projections will actually mate with the recessions in the assembled hose since, if the projections and/or recessions are relatively wide or widely spaced, the projections may land between the recessions unless the hose diameter is held to very close tolerances. Accordingly, it is preferred that the recessions are spaced about one-fourteenth inch center to center and that the projections are spaced an equivalent distance.

The indentations 15 are open ended, and permit a small but significant amount of axial movement between the helical turns or convolutions which enables the hose to flex, as best illustrated in FIG. 2.

Flexible metal hose has long been formed by advancing a flat metal strip through a series of "profile" rollers which profile or deform the strip in stages, eventually deforming the strip into its characteristic interlocking helical configuration. This technique is well known to persons of ordinary skill in the flexible metal hose forming art and it is shown and described with respect to smooth bore hose, for example, in U.S. Pat. Nos. 1,598,872 and 1,580,760.

The flexible metal hose of the present invention is likewise normally and preferably formed by advancing a flat metal strip through a series of profile rollers which deform the strip in stages, eventually deforming the strip into its characteristic interlocking helical configuration. The indentations and projections are preferably formed with two or more pairs of special rollers ("indenting wheels" hereinafter) which resemble spur gears. Conventional strip-wound flexible metal hose forming equipment may be employed and the indenting wheels are merely positioned intermediate in the series of deforming profile rollers. Both the projections and indentations are formed by indenting the metal between the meshing teeth of these opposed gear-like rollers so that the projections so formed are actually the opposed convex surfaces of indentations made in the reverse surface.

In this regard, it will be noted that the projections 14 and indentations 15 shown in FIGS. 1-5 are elongated in a direction which is perpendicular to the edge of the strip 2. As a result, due to the helical pitch of the strip 2 in the assembled hose, the projections 14 and indentations 15 lie at a slight angle to the axis of the hose 1. This angle increases in direct proportion to the pitch angle of the helically wrapped strip 2 (which depends upon a variety of factors including the width of the turn and the hose diameter). Normally, the pitch angle of a turn is relatively small so that the projections 14 and recessions 15 lie at a relatively slight angle (for example, on the order of about of about 3°) to the hose axis. It will be noted that this is considered to be "generally parallel to the hose axis" as that phrase is employed in this specification and the following claims. If the pitch angle is relatively large so that the projections 14 and recessions 15 form a relatively large angle (for example, on the order of about 6°) with the hose axis, this is still considered "generally parallel to the hose axis" as that term is understood herein, but it should be noted that the effect of having the projections and recessions angled from the hose axis is to cause adjacent turns to undergo a slight angular twist when they slide against one another as the hose flexes. Being controlled and slight, this twisting does not normally cause any problems. If a problem does result from this, however, it may be cured by forming the projections 14 and recessions 15 at a slight angle to the edge of the metal strip 2 (as with an indenting wheel resembling a helical gear) so that they will lie more nearly or precisely parallel to the hose axis when the strip 2 is wound in its characteristic helical configuration.

When the projections and recessions are formed, as shown, by indenting the helical metal strip, the width, depth (height) and spacing of the projections and recessions will be limited by the thickness of the metal strip. Relatively thick metal will not admit to very close spacing of the projections (or recessions), so that the dimensions may preferably be enlarged from those described for thinner metals above. Conversely, where unusually thin metal is employed, it may be preferable to reduce the width, depth (height) and spacing of the projections and recessions. These variations, however, will be readily apparent to persons of ordinary skill.

While the embodiment shown in FIGS. 1–5 employs single rows of spaced mating projections 14 and indentations 15, other surface configurations may be employed within the scope of the present invention. For example, double rows of projections and indentations may be provided (not shown); or a single row of elongated indentations 16 could be mated with several rows of point-like projections 17 (as shown in FIG. 8); or a single row of elongated projections 18 could slide between rows of point-like projections 19 (as shown in FIG. 9). Other surface configurations which may be employed within the scope of the present invention will be apparent to persons of ordinary skill.

The aforementioned point projections and recessions may be formed with an opposed pair of indenting wheels which, instead of being shaped like spur gears as previously described, have convex bosses on one wheel and concave boss-receiving recessions in the opposed wheel. The precise surface shapes of a pair of opposed indenting wheels required to form a particular series of surface configurations on the hose of the present invention will be readily apparent to persons of ordinary skill.

A further embodiment is shown in FIG. 6, consisting of a section of flexible lined ("smooth bore") metal hose 20 constructed in accordance with the principles of the present invention. This embodiment is constructed of two metal strips 21 and 33. The first metal strip 21 is formed very similarly to that shown in FIGS. 1–5 and described in connection therewith. Briefly, the formed strip 21 is comprised, in cross section, of a first axially extending free edge portion 22 and a first medial portion 23 parallel thereto and joined by a first narrow radial base portion 24 to form a first channel 25; and a second axially extending free edge portion 26 joined by a second narrow radial base portion 27 to an axially extending second medial portion 28 forming a second channel 29.

The first and second free edge portions 22 and 26 lie generally parallel to both the hose axis and the first and second medial portions 23 and 28, respectively. The first and second medial portions 23 and 28 are offset from one another, being joined by a narrow generally radial connecting portion 30.

The first metal strip 21 is helically wound with the first free edge portion 22 locating in the second channel 29 and the second free edge portion 26 locating in the first channel 25. The second medial portion 28 is located on the outer surface of the hose.

The second metal strip 33 lines the interior of the hose 20. This liner strip 33 is comprised of first and second generally axially extending free edge portions 31 and 32 offset from one another and joined by a radial connecting portion 30. In the hose 20, the first free edge portion 31 of the liner strip 33 is located between the first free edge portion 22 and the second medial portion 28 of the first strip 21. The second free edge portion 32 of the liner strip 33 extends at a slight angle but still generally parallel to the hose axis on the inside of the hose adjacent the first medial portion 23 of the first metal strip 21. Thus, the liner strip 33 forms a helically wound lining about the interior surface of the cylinder formed by the helically wound first metal strip 21. The first free edge portion 31 ("mounting flange" 31 hereinafter) of the liner strip 33 is interfolded between two adjacent portions of adjacent turns of the first strip; and, its second free edge portion 32 ("liner flange" 32 hereinafter) being relatively long, lines the interior of the cylinder, overlapping itself on adjacent turns shingle-fashion.

Adjacent surfaces of the second medial portion 28 of the first strip 21, the mounting flange 31 of the liner strip 33, and the first free edge portion 22 of the first strip 21 are provided with a plurality of shallow, circumferentially spaced mating projections 34a and 34b and indentations 35a and 35b, respectively, which are elongated in a direction generally parallel to the hose axis. Thus, as in the embodiment shown in FIGS. 1 to 5, adjacent turns of the hose (including the liner 33) are free to slide axially against one another during flexing, but are hindered from sliding in other directions.

As in the case of unlined hose, as shown in FIGS. 1–5, for example, the surface configurations of the lined hose 20 may be of various types (such as shown in FIGS. 9 and 10) within the scope of the present invention, as will be apparent to persons of ordinary skill.

In addition, different types of liners may be employed or mounted in a different manner, all within the scope of the invention as will be readily apparent to persons of ordinary skill. It is preferred, for example, that the mounting flange of the liner be slidably retained between the adjacent surfaces of the first metal strip 21 as described above. It is possible, however, that the mounting flange 31 be fixedly fastened to one of the surfaces of the first metal strip 21 (as by welding, or with specially formed ribs, or with mating point projections and point indentations) and slidable against only the other adjacent surface of the first metal strip 21, since the flexibility of the hose is not necessarily dependent upon freedom of the liner 33 with respect to the strip, but upon the freedom of adjacent turns of the first strip 21 relative to one another.

Furthermore, in other embodiments (not shown) a metal shield strip formed similarly to the liner strip may be employed to cover the outer surface of the hose. This shield strip may be mounted in much the same manner as the liner strip, but to overlay the outer surface of the hose rather than its inner surface all within the scope of the present invention as will be apparent to persons of ordinary skill.

Figure 7:
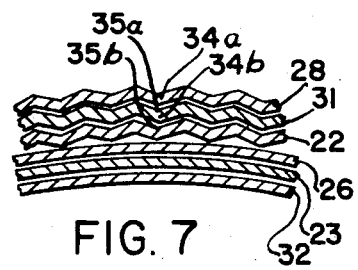
FIG. 7 is an enlarged section of the hose shown in FIG. 6, taken along the lines 7—7 of FIG. 6.

A third embodiment is shown in FIG. 7, consisting of a section of asbestos packed plastic coated unlined flexible metal hose 36 constructed in accordance with the principles of the present invention. This embodiment is constructed of a single metal strip 37 bearing a thin plastic coating 38 on both major surfaces, (normally coated before forming) which is formed in very much the same manner as that shown in FIGS. 1–5 and described in connection therewith. In the past, flexible hose formed from plastic coated metal had a relatively great tendency to part due to the low coefficient of sliding friction of the plastics employed. The present invention is thus particularly useful in the construction of plastic coated flexible housing of the type described. Briefly, the formed plastic coated metal strip 37 is comprised, in cross-section, of a first axially extending free edge portion 39 and a first medial portion 40 parallel thereto and joined by a first narrow radial base portion 41 to form a first channel 42; and a second axially extending free edge portion 43 joined by a second narrow radial base portion 44 to an axially extending second medial portion 45 forming a second channel 46.

The first and second free edge portions 39 and 43 lie generally parallel to both the hose axis and the first and second medial portions 40 and 45, respectively. The first and second medial portions 40 and 45 are offset from one another, being joined by a narrow generally radial connecting portion 47.

The metal strip 37 is helically wound with the first free edge portion 39 locating in the second channel 46 and the second free edge portion 43 locating in the first channel 42. The strip 37 is wound so that the second medial portion 45 is located on the hose's outer surface.

The second free edge 43 of the strip 37 has a groove 48 in its radially inner surface which runs the entire length of the helically wound strip 37 and a length of asbestos string 49 locates therein to form a heat and moisture resistant packing.

Adjacent surfaces of the second medial portion 45 and the first free edge portion 39 are provided with a plurality of spaced mating projections 50 and indentations 51 aligned in a single row and elongated in a direction generally parallel to the hose axis. As in other embodiments of the present invention, different surface configurations may be employed here to the same end, as will be apparent to persons of ordinary skill.

A further embodiment of the present invention is shown in FIG. 9 comprising a section of flexible hose 59 made from a metal strip 60 formed in a generally S-shaped cross sectional configuration with a first axially extending free edge portion 61 and a first medial portion or longitudinal body portion 62 parallel thereto and joined by a narrow base portion 63 to form a first channel 64; and a second axially extending free edge portion 65 joined by a second narrow base portion 66 to an axial second medial portion 67 forming a second channel 68.

The first and second free edge portions 61 and 65 lie generally parallel to both the hose axis and the first and second medial portions 62 and 67, respectively. The first and second medial portions 62 and 67 are offset from one another, being joined by a narrow generally radial connecting portion or web portion 69.

In the assembled hose, the second medial portion 67 overlaps the first free edge portion 61 of each adjacent turn, and the first free edge portion 61 is provided with two rows of generally axially aligned point projections 70 which project radially outwardly into recessions 71 formed in the radially inner surface of the second medial portion 67.

A still further embodiment of the present invention is shown in FIG. 10 comprising a section of flexible metal hose 80 made from a metal strip 81 formed in a generally S-shaped cross sectional configuration with first and second axially extending free edge portions 82 and 83 joined to first and second medial portions 84 and 85, respectively, which are, in turn, joined to one another in an offset fashion by a narrow generally radial connecting portion 86.

In the assembled hose, the second medial portion 85 overlays the first free edge portion 82 of each adjacent turn, and the second medial portion 85 is provided with three rows of generally axially aligned point projections 87 which project radially inwardly and slide in the recessions 89 between a plurality of axial projections 88 projecting radially on outwardly from the radially outer surface of the second medial portion 85.

While the foregoing embodiments have shown projections and recessions located on flat surfaces parallel to the hose axis, it will be understood that the present invention is not limited to this precise construction but contemplates other embodiments as will be apparent to persons of ordinary skill and may carry mating surface configurations on any suitable surface, including surfaces which may have a small curvature or are otherwise not precisely parallel to the hose axis.

It should be realized that any of the hoses shown and described herein may be of any convenient size so long as the dimensions of the elements thereof are such as to provide the desired operative configurations.

Also, in addition to the advantages discussed above, the elongated axial projections and recessions, for example, as shown in FIGS. 1–5, serve to strengthen the wall of the hose and this is accomplished without any appreciable loss in hose flexibility or increase in production cost over hose of this type constructed without the surface configurations embodied in the present inven-tion. This added strength will, in certain applications, actually lead to a reduction in the cost of the hose to the extent that it may permit a hose manufacturer to meet consumer specifications using a thinner gage metal strip or lower quality metal than would have been required to meet those specifications with hose constructions of previous design.

We claim:

1. Flexible metal hose of the type formed from a helically wound metal strip with the edges of adjacent convolutions interfolded, said convolutions having first surfaces which undergo significant sliding movement relative to second surfaces of adjacent convolutions when said hose is flexed; wherein the improvement comprises a plurality of shallow projections and recessions on said first and second surfaces of said convolutions, but not on the radially innermost surface of said hose, said projections slidably locating in said recessions, said recessions formed to allow said projections to slide freely therein generally parallel to the hose axis, said recessions formed to impede said projections from substantial sliding movement therein in directions not generally parallel to the hose axis.

2. Flexible metal hose as recited in claim 1 wherein said projections are spaced ribs elongated generally in the axial direction serving to reinforce the surface on which said ribs are located against bending about an axis generally perpendicular to the plane of said hose axis.

3. Flexible metal hose as recited in claim 2 wherein said recessions are the opposed concave surfaces of spaced ribs elongated generally in the axial direction serving to reinforce the surfaces on which said ribs are located against bending about an axis generally perpendicular to the plane of said hose axis.

4. Flexible metal hose as recited in claim 1 wherein said recessions are the opposed concave surfaces of spaced ribs elongated generally in the axial direction serving to reinforce the surfaces on which said ribs are located against bending about an axis generally perpendicular to the plane of said hose axis.

5. Flexible metal hose as recited in claim 1 wherein said projections are angularly spaced about one-fourteenth inch center to center.

6. Flexible metal hose as recited in claim 5 wherein said projections are less than about one twenty-eighth inch high and said recessions are less than about one twenty-eighth inch deep.

7. Flexible metal hose as recited in claim 1 wherein said recessions are angularly spaced about one-fourteenth inch center to center.

8. Flexible metal hose as recited in claim 7 wherein said projections are less than about one twenty-eighth inch high and said recessions are at least one twenty-eighth inch deep.

9. Flexible metal hose as recited in claim 1 wherein said metal strip is provided with a plastic coating.

10. Flexible metal hose of the type formed from a first helically wound metal strip having a first lateral edge and a second lateral edge, and a second helically wound metal strip with one lateral edge of adjacent convolutions of said second strip and said first lateral edge of said first metal strip interfolded, said second lateral edge of each convolution of said first strip overlapping a portion of each adjacent convolution of said first strip, said second strip having first and second generally parallel off-set surfaces, said first lateral edge of each convolution of said first strip located between said first surface of each convolution of said second strip and said second surface of each adjacent convolution of said second strip, the surface of said first lateral edge of said first strip undergoing significant sliding movement relative to one of said first and second surfaces of said second strip when said hose is flexed:

wherein the improvement comprises a plurality of closely spaced shallow projections and recessions on said slidably engaging surfaces of said first and second strips, but not on the radially innermost surface of said hose, said projections slidably located in said recessions, said recessions formed to allow said projections to slide freely therein generally parallel to the hose axis, said recessions formed to impede said projections from substantial sliding movement therein in directions not generally parallel to the hose axis.

11. Flexible metal hose as recited in claim 10 wherein said second lateral edge of said first metal strip extends on the radially inner side of said second metal strip to line the interior or said hose.

12. Flexible metal hose as recited in claim 11 wherein said projections are spaced ribs elongated generally in the axial direction serving to reinforce the surfaces on which said ribs are located against bending about an axis generally perpendicular to the plane of said hose axis.

13. Flexible metal hose as recited in claim 12 wherein said recessions are the opposed concave surfaces of spaced ribs elongated generally in the axial direction serving to reinforce the surfaces on which said ribs are located against bending about an axis generally perpendicular to said hose axis.

14. Flexible metal hose as recited in claim 11 wherein said recessions are the opposed concave surfaces of spaced ribs elongated generally in the axial direction serving to reinforce the surfaces on which said ribs are located against bending about an axis generally perpendicular to the plane of said hose axis.

15. Flexible metal hose as recited in claim 10 wherein said projections are spaced ribs elongated generally in the axial direction serving to reinforce the surfaces on which said ribs are located against bending about an axis generally perpendicular to the plane of said hose axis.

16. Flexible metal hose as recited in claim 10 wherein said recessions are the opposed concave surfaces of spaced ribs elongated generally in the axial direction serving to reinforce the surfaces on which said ribs are located against bending about an axis generally perpendicular to the plane of said hose axis.

17. Flexible metal hose as recited in claim 16 wherein said projections are spaced ribs elongated generally in the axial direction serving to reinforce the surfaces on which they are formed against bending about an axis generally perpendicular to the plane of said hose axis.

18. Flexible metal hose as recited in claim 10 wherein said projections are angularly spaced about one-fourteenth inch center to center.

19. Flexible metal hose as recited in claim 18, wherein said projections are less than about one twenty-eighth inch high and said recessions are at least about one twenty-eighth deep.

20. Flexible metal hose as recited in claim 10 wherein said recessions are angularly spaced about one-fourteenth inch center to center.

21. Flexible metal hose as recited in claim 20 wherein said projections are less than about one twenty-eighth inch high and said recessions are at least one twenty-eighth inch deep.

22. Flexible metal hose as recited in claim 10 wherein said first and second metal strips are each provided with a plastic coating.

23. Flexible metal hose of the type formed from a helically wound metal strip, each convolution of said strip having in cross section a first free edge portion disposed generally parallel to the hose axis;

a first narrow end portion extending radially inwardly from the forward end of said first edge portion;

a first medial portion extending rearwardly from the radially inner end of said first narrow end portion generally parallel to said first free edge portion and spaced therefrom to form a rearwardly opening first channel;

a narrow connecting portion extending radially outwardly from the rear end of said first medial portion;

a second medial portion extending rearwardly from the radially outer end of said narrow connecting portion to lie generally parallel to the hose axis;

a second free edge portion extending forward from the radially outer end of said second end portion to form a forward opening second channel;

each of said convolutions interfolded with an adjacent convolution, said first free edge of one convolution slidably received in said second channel of an adjacent convolution, adjacent surfaces of said free edge portions and medial portions slidably engaged, wherein the improvement comprises a plurality of small circumferentially arranged deformations disposed throughout the length of said hose on at least two of said slidably engaged surfaces, said deformations including recessions on one of said surfaces and projections on the adjacent slidably engaged surface, said recessions formed to allow said projections to slide freely therein in directions generally parallel to the hose axis when said hose is flexed and to impede sliding movement in other directions, said narrow end portions being substantially free of said deformations 24. Flexible hose as recited in claim 23 wherein said projections are spaced ribs elongated generally in the axial direction serving to reinforce the surface on which said ribs are located against bending about an axis generally perpendicular to said hose axis.

25. Flexible hose as recited in claim 24 wherein said recessions are the opposed concave surfaces of spaced ribs elongated generally in the axial direction serving to reinforce the surface on which said ribs are located against bending about an axis generally perpendicular to the plane of said hose axis.

26. Flexible hose as recited in claim 23 wherein said recessions are the opposed concave surfaces of spaced ribs elongated generally in the axial direction serving to reinforce the surface on which said ribs are located against bending about axis generally perpendicular to the plane of said hose axis.

27. Flexible metal hose as recited in claim 23 wherein said metal strip is provided with a plastic coating.

28. Flexible metal hose of the type formed from a first helically wound metal strip having a first lateral edge and a second lateral edge, and a second helically wound metal strip, each convolution of said second strip having in cross section a first free edge portion disposed generally parallel to said hose axis;

a first narrow end portion extending radially inwardly from the forward end of said first edge portion;

a first medial portion extending rearwardly from the radially inner end of said first narrow end portion generally parallel to said first free edge portion and spaced therefrom to form a rearwardly opening first channel;

a narrow connecting portion extending radially outwardly from the rear end of said first medial portion;

a second medial portion extending rearwardly from the radially outer end of said narrow connecting portion to lie generally parallel to the hose axis;

a second narrow end portion extending radially inwardly from the rear end of said second medial portion; and a second free edge portion extending forward from the radially outer end of said second end portion to form a forward opening second channel;

said first lateral edge of each convolution of said first metal strip and one of said free edge portions of each convolution of said second metal strip slidably received in one of said channels of each adjacent convolution of said second metal strip, said second lateral edge of each convolution of said first metal strip overlapping a portion of an adjacent convolution wherein the improvement comprises a plurality of small circumferentially arranged deformations disposed throughout the length of said hose on at least two of the slidably engaged surfaces, said deformations including recessions on one of said surfaces and projections on the adjacent slidably engaged surfaces and projections on the adjacent slidably engaged surface, said recessions formed to allow said projections to slide freely therein in directions generally parallel to the hose axis when said hose is flexed and to impede sliding movement therein in other directions, said narrow end portions being substantially free of said deformations.

29. Flexible hose as recited in claim 28 wherein said projections are spaced ribs elongated generally in the axial direction serving to reinforce the surface on which said ribs are located against bending about an axis generally perpendicular to the plane of said hose axis.

30. Flexible hose as recited in claim 29 wherein said recessions are opposed concave surfaces of spaced ribs elongated generally in the axial direction serving to reinforce the surface on which said ribs are located against bending about an axis generally perpendicular to the plane of said hose axis.

31. Flexible hose as recited in claim 28 wherein said recessions are opposed concave surfaces of spaced ribs elongated generally in the axial direction serving to reinforce the surface on which said ribs are located against bending about an axis generally perpendicular to the plane of hose axis.

32. Flexible metal hose as recited in claim 28 wherein said first and second metal strips are each provided with a plastic coating.

33. Flexible metal hose of the type formed from a helically wound metal strip with the edges of adjacent convolutions each folded reversely and interconnected so that at said interconnection the wall of said hose is comprised of at least four layers of said metal strip, said layers undergoing significant sliding movement relative to one another when said hose is flexed, wherein the improvement comprises corrugations formed in the two outermost layers at said interconnection, but not in the innermost layer, said corrugations comprising a plurality of minute angularly spaced ridges and grooves, said ridges on one of said layers slidably located in said grooves on another of said layers, said ridges and grooves extending generally parallel to said hose axis to permit said layers to slide over each other in a direction generally parallel to said hose axis while tending to impede said layers from sliding over each other in directions transverse to said hose axis.

34. A flexible metal hose of the type formed from a helically wound strip of metal which in cross-section has two substantially parallel longitudinal body portions, the opposing inner edges of which are off-set from each other and connected by a web portion, the outer longitudinal edges of said strip being bent reversely along opposite sides of said body portions to form hook portions, and the hook portion on one edge of one convolution interlocking with the hook portion on the opposite edge of the next convolution, adjacent surfaces of said body and hook portions undergoing substantial sliding movement relative to one another in a direction parallel to the hose axis when said hose is flexed, wherein the improvement comprises a plurality of circumferentially spaced shallow deformations along substantially the entire extent of two of said slidingly engaged surfaces, but not on the radially innermost longitudinal body portion, said deformations comprising alternating projections and recessions, said projections on one convolution slidably located in the recessions on the deformed slidably engaging portion of the next convolution, said recessions formed to permit said projections to slide therein a direction generally parallel to the hose axis and to impede sliding movement in other directions, so that while the hose walls are deformed to prevent sliding in non-axial directions, the radially inner surface of the radially innermost body portion of each convolution describes a smooth cylindrical surface of uniform circular cross-section.

35. A flexible metal hose of the type having first and second helically wound metal strips, said first metal strip in cross-section having two substantially parallel longitudinal body portions, the opposing inner edges of which are off-set from each other and connected by a web portion, the outer longitudinal edges of said strip being bent reversely along opposite sides of said body portions to form hook portions, the hook portion on one edge of one convolution interlocking with the hook portion on the opposite edge of the next convolution, and said second metal strip in cross-section having two substantially parallel longitudinal body portions, the opposing inner edges of which are off-set from each other and connected by a web portion, said second strip having its web engaging the web of said first strip and the front longitudinal edge of said second strip being arranged between the body portion of one convolution and the rear hook portion on the rear edge of the preceding convolution, and the rear longitudinal edge of said second strip being arranged between the inner side of the rear body portion of the respective first strip convolution and the rear edge of the preceding second strip convolution and also engaging with the inner side of the rear part of the next following convolution of the second strip, adjacent surfaces of said first and second strips undergoing substantial sliding movement relative to one another in a direction parallel to the hose axis when said hose is flexed, wherein the improvement comprises a plurality of closely spaced shallow deformations along substantially the entire extent of two of said slidably engaged surfaces of said first and second strips, but not on the radially innermost longitudinal body portion of said second strip, said deformations comprising alternating projections and recessions, said projections on one convolution slidably locating in the recessions on the deformed slidably engaging portion of the next convolution, said recessions formed to permit said projections to slide freely therein in a direction generally parallel to the hose axis and to impede sliding movement in other directions, so that while the hose walls are deformed to prevent the convolutions from sliding against one another in non-axial directions, the radially inner surface of the radially innermost body portion of each convolution of said second strip describes a smooth cylindrical surface of uniform circular cross-section.

36. Flexible metal hose of the type formed from a helically wound metal strip, each convolution of said strip having in cross-section
  a first free edge portion disposed generally parallel to the hose axis;
  a first narrow end portion extending radially inwardly from the forward end of said first edge portion;
  a first medial portion extending rearwardly from the radially inner end of said first narrow end portion and spaced therefrom to form a rearwardly opening first channel;
  a narrow connecting portion extending radially outwardly from the rear end of said first medial portion;
  a second medial portion extending rearwardly from the radially outer end of said narrow connecting portion to lie generally parallel to the hose axis;
  a narrow end portion extending radially inwardly from the rear end of said second medial portion; and
  a second free edge portion extending forward from the radially outer end of said second end portion to form a forward opening second channel;
each of said convolutions interfolded with an adjacent convolution, said first free edge of one convolution slidably received in said second channel of an adjacent convolution with adjacent surfaces of said free edge portions and medial portions slidably engaged, said hose in cross-section being substantially cylindrical, said first and second medial portions respectively forming the radially innermost and radially outermost substantially cylindrical surfaces of said hose, wherein the improvement comprises a plurality of small circumferentially arranged deformations disposed throughout the length of the hose on two of said slidably engaged surfaces, said deformations including recessions on one of said surfaces and projections on the adjacent slidably engaged surface, said recessions formed to permit said projections to slide freely therein in directions generally parallel to the hose axis and to impede sliding movement in other directions.

37. Flexible metal hose as defined in claim 36 wherein said deformations are comprised of rows of alternating projections and recessions, said projections and recessions being narrow and elongated generally in the axial direction so that they serve to reinforce the surface on which they are formed against bending about an axis generally perpendicular to the plane of said hose axis.

38. Flexible metal hose as defined in claim 37 wherein said deformations are located only on said second medial portion and said first free edge portion.

39. A flexible metal hose of the type formed from a helically wound strip of metal which in cross-section has two substantially parallel longitudinal body portions, the opposing inner edges of which are off-set from each other and connected by a web portion, the outer longitudinal edges of said strip being bent reversely along opposite sides of said body portions to form hook portions, and the hook portion on one edge of one convolution interlocking with the hook portion on the opposite edge of the next convolution, adjacent surfaces of said body and hook portions undergoing substantial sliding movement relative to one another in a direction parallel to the hose axis when said hose is flexed, wherein the improvement comprises a plurality of small circumferentially arranged deformations on two of said slidingly engaged surfaces, said deformations including recessions on one of said surfaces and projections on the other of said surfaces, said recessions formed to permit said projections to slide freely therein in directions generally parallel to the hose axis and to impede sliding movement in other directions, said projections and recessions being of a height and depth respectively less than about twice the thickness of said metal strip.

* * * * *